Patented Mar. 13, 1951

2,545,150

UNITED STATES PATENT OFFICE 2,545,150

PHENOL FORMALDEHYDE RESINS

William Krumbhaar, New York, N. Y.

No Drawing. Application April 14, 1949,
Serial No. 87,565

20 Claims. (Cl. 260—25)

This invention relates to resinous products of extremely high melting point and viscosity and more particularly to rosin modified phenol formaldehyde type resins, to methods of producing such resins and condensation products, to methods of making components utilized in producing such products, and to the utilization of such products.

Rosin modified maleic glycerine esters, known in the trade as maleic resins, have great practical importance for the manufacture of surface coatings and printing inks. For this purpose the maleic resins must have high melting points and viscosity, combined with good solubility and fusibility. The prior art was able to combine these requirements only to a limited extent. If melting points and viscosities were increased by increasing the amounts of maleic compound in the resin, the solubility and fusibility was quickly lost. According to the methods of the prior art, it was not possible to increase the melting point of rosin modified maleic glycerine esters beyond 155° C. (determined by means of the A. S. T. M. method), without causing the resin to become insoluble and infusible. Neither was the prior art capable of increasing the viscosity of a rosin modified maleic glycerine ester beyond Z, determined as a 60% resin solution in xylol on the Gardner scale, without causing the resin to gelatinize in the product kettle.

In prior application Serial No. 694,825 entitled Rosin Maleic Glycerine Esters now Patent No. 2,470,855 granted May 24, 1949, of which the present application is a continuation-in-part, the production of rosin modified maleic glycerine esters which overcame the limitations of the prior art, was disclosed and the production set forth of soluble and fusible maleic resins with substantially higher characteristics, i. e., with melting points exceeding 180° C. and viscosities not less than $Z_3$.

In accordance with the invention of that parent application it was found that monomolecular rosin maleic acid has unique properties in the resin production art and that the glycerine esters of the monomeric acid retain their solubility and fusibility in spite of extremely high melting points and viscosities. That prior application taught the production of monomolecular rosin maleic acid for utilization in the production of the new ester type resins as follows. As is well known, rosin and maleic anhydride or maleic acid react with each other forming a chemical compound, in which the basic ingredients are combined in the proportion of the molecular weights, i. e., 302 for abietic acid and 98 or 116 for maleic anhydride or acid respectively. The reaction starts at about 100° C. and can be carried through to completion at top temperatures of from 160 to 220° C. The resulting product, in short called rosin maleic acid, has an acid value of about 270, a melting point of about 140° C., and a molecular weight varying between 650 and 800, the molecular weight increasing with time and temperature of heating. The molecular weight indicates that the fused rosin maleic acid contains both the monomolecular form with a weight of 400, and the dimolecular substance with a molecular weight of 800, the dimerized portion being in the majority.

The rosin maleic reaction product is soluble in ethyl alcohol; however, the solutions are not stable and on standing form a white crystalline precipitate, which by combustion analysis and by determination of molecular weight, is identified as the monomeric form of the rosin maleic acid. The white crystals separate completely and can be obtained in pure form by filtration, washing with alcohol and drying at 110° C. for 24 hours. The last traces of alcohol adhere very firmly, however, but their removal is unnecessary for technical purposes.

In achieving the purposes of the invention of that prior application, the crystalline monomeric acid must be produced with a reasonable speed, i. e., within one to two weeks, and with as high a yield as possible. The following rules have been found to govern the speed and quantity of crystallization obtained.

The speed of crystal formation increases with the resin concentration in the alcohol solution, i. e., a 50% solution may form crystals over night, whereas a 25% solution may require one to two weeks. The speed also is pronouncedly accelerated by the action of light, but is not influenced by low temperature, water content of the alcohol, additions of crystal nuclei or mineral acids like hydrochloric acid.

The quantity of the white precipitate, weighed after washing and drying, amounts to 35 to 40% of the total weight of rosin maleic compound, originally present in the solution. 30 to 33% precipitates quickly, while the balance crystallizes only slowly over a period of several weeks. After this time the solution is free from crystallizable material. Investigation shows that the resin remaining in alcohol solution has an acid value of about 200 and a melting point of 140° C. The solution, therefore, is utilizable as a substitute for shellac solutions.

The yield of the crystalline rosin maleic acid declines when the temperature at which the two ingredients are reacted, is increased. Suitable reaction temperatures lay between 160° and 220° C., the best temperature range for practical purposes being 180 to 200° C. The yield from gum rosin is slightly higher than from wood rosin. Polymerized rosin is restricted in its reactivity with maleic anhydride or acid, and hydrogenated rosin does not react at all. Both rosin types, therefore, are unsuitable for preparing the rosin maleic acid.

Crystalline precipitates are also obtained from rosin maleic reaction mixtures, in which the rosin is in excess of the molecular equivalent, but the yield is considerably smaller than that obtained from a product containing equi-molecular amounts. Instead of maleic anhydride or maleic acid, malic acid can be used for the production of the monomeric rosin maleic acid. The yield, however, is so small that it makes malic acid uneconomical for this purpose.

The acid value of the crystalline acid can be determined by neutralization with $n/10$ alcoholic potassium hydroxide in toluol solution at room temperature, and is found to be 280. The crystals do not show any positive Liebermann-Storch reaction, indicating the absence of even traces of rosin.

The melting point of the material is found to be 225° C., i. e., extremely high and higher than the melting point of any other polybasic acid used in resin manufacture. The melting point is very sharp and fusion at the melting point occurs without decomposition. If heated more than 20° C. beyond the melting point, the monomeric compound starts to polymerize into the dimolecular product, as shown by the increase in molecular weight, which gradually goes up from 400 to 800. Dimerization is completed after several hours' heating at 280° C.

The melting point of the polymerized rosin maleic acid is about 75° C. lower than that of the monomeric acid, therefore, polymerization must be carefully avoided when the acid is esterified by glycerine.

The esterification of the monomeric acid is carried out in any desired way, as by fusing the ingredients gently together at temperatures which may be a few degrees above 225° C., and then heating the mixture to the temperature of esterification. This should generally be below 280° C. Ester formation with glycerine occurs with slow speed at 240 to 250°, and is more practically carried out at 260 to 270° C.

The glycerine esters of the monomeric rosin maleic acid have unique properties which are quite different from those of the polymerized acid. They are fusible without gelling, heat hardening, charring or decomposition; they possess extremely high melting points of 180 to 200° C. and higher, depending upon the degree of neutralization. An ester of an acid value of about 100 for instance, possesses a melting point of 195° C. The amount of glycerine may vary from 15 to 25% by weight of the monomeric rosin maleic acid. If lower amounts are used, the rosin maleic acid is not esterified quickly enough to avoid polymerization and decomposition; if higher amounts are employed, the ester product contains mono- and di-glycerides. Both conditions tend to lower the melting point.

Equivalent esters of the dimolecular rosin maleic acid cannot be produced because when esterification is attempted, the reaction mixture gelatinizes into an infusible and insoluble mass, as soon as a melting point of 155° C. is reached using for instance, 20% glycerine and an esterification temperature of 260° C. the resin converts into a gel after 5 hours' heating.

The reason for the vastly different behavior of the monomeric and the dimolecular ester is probably to be found in the great difference of their molecular size. A simple calculation shows that the ester of the monomeric acid should possess a molecular weight of about 1300, which is entirely in the field of soluble and fusible resins, whereas the dimeric acid should have a molecular weight of about 2500, i. e., a size which is far beyond the borderline of 2000, beyond which resins become insoluble and infusible.

The glycerine esters of the monomeric rosin maleic acid are soluble in coal tar solvents, giving solutions which are homogeneous in appearance and free from overpolymerized particles, a 60% xylol solution yielding a viscosity of about $Z_5$ to $Z_6$ on the Gardner scale.

The resins are also miscible and soluble in all rosin based resinous esters, this property enabling very useful application of the new esters in the improvement of such resins. The new high melting point and high viscosity resinous esters described in this invention, dissolve at temperatures for example, of 225 to 250° C. in other resins, in particular in rosin glycerine or pentaerythritol esters and in resin modified maleics or phenolics, or combinations of such resins, improving their melting point and their viscosity. They also dissolve in fused natural copals, copal type synthetic resins and other copal based resinous esters, rendering them harder and more viscous.

Examples 1 and 2 demonstrate the method of preparing the monomeric rosin maleic acid.

*Example 1.*—300 parts of gum rosin are fused together with 100 parts of maleic anhydride and reacted at 180° C. for 2 hours. After the foaming has subsided, the reaction mixture, weighing 380 parts, is poured out for cooling, broken up in small pieces and dissolved in an equal amount by weight of 95% ethyl alcohol. The solution is stored at room temperature, preferably with access of light, for one week. The white crystalline mass precipitated during this period is filtered off, washed once with alcohol and dried overnight at 110° C. The yield of monomeric rosin maleic acid obtained this way, is 145 parts, i. e., 38% of the fused reaction product.

*Example 2.*—300 parts of wood rosin are heated with 120 parts of maleic acid slowly to 200° C. and held at this temperature for one hour, after which time the reaction is completed. The resulting resinous mass, after cooling and breaking up, is dissolved in 275 parts by weight of denatured alcohol and the solution is stored for 2 weeks at room temperature, with its surface exposed to the light. During this period the monomeric rosin maleic acid is precipitated in the form of white crystals, which settle and are easily filtered off. The washed and dried precipitate weighs 125 parts, meaning a yield of 33%.

Examples 3 and 4 illustrate esterification of the monomeric rosin maleic acid.

*Example 3.*—100 parts of the crystalline acid, obtained according to the procedure described in Example 1 are fused gently and mixed thoroughly with 18 parts of 95% C. P. glycerine at a temperature of 228°. The mixture is then heated to 265° and held at 265° for 4 hours with vacuum applied during the last hour. The resulting resinous ester has a melting point of 205° C. and a viscosity of $Z_6$ in 60% xylol solution on the Gardner scale.

*Example 4.*—100 parts of the white crystals of rosin maleic acid produced by the method described in Example 2 are carefully melted and mixed with 22 parts of glycerine. The temperature then is gradually raised to 260° C., held there for 6 hours, using vacuum during the last 2 hours. In this way a glycerine ester of the monomeric acid is obtained, which has a melting point of 195° C. and a viscosity of $Z_5$ in 60% xylol solution on the Gardner scale.

Among the objects of the present invention is the utilization of the stated esters of the monomeric rosin maleic acid in the production of rosin modified phenolic resins of improved melting point and viscosity.

A principal object of this invention is the production of combinations of the previously mentioned high melting and high viscosity maleic resins with rosin modified phenolic resins.

Other objects and advantages of the present invention will appear from the more detailed description set forth below, it being understood that such more detailed description is given by way of illustration and explanation only, and not by way of limitation, since various changes may be made therein by those skilled in the art without departing from the scope and spirit of the present invention.

In accordance with the present invention, the monomeric rosin maleic glycerine esters referred to above are utilized in the production of phenol formaldehyde resins or condensation products of high melting point and high viscosity. For this purpose all that is necessary is to react as by fusion, a monomeric rosin maleic glycerine ester as set forth above with the desired rosin phenol formaldehyde condensation product. As pointed out above the rosin maleic glycerine ester employed is desirably a fusible rosin maleic glycerine ester having a melting point higher than 180° C. and a viscosity higher than $Z_3$, soluble in cold tar solvent, the rosin maleic acid contained in the ester being monomolecular and the content of glycerine generally varying between 15 and 25% by weight of the monomeric acid. As exemplified in the specific examples given above such fusible rosin maleic glycerine esters include the ester having a melting point of approximately 195° C. and a viscosity of $Z_5$ in 60% xylol solution on the Gardner scale, and the fusible rosin maleic glycerine ester with a melting point of 205° C. and a viscosity of $Z_6$, both particular types of such esters being soluble in cold tar solvents, the rosin maleic acid contained in the esters being monomolecular, and the content of glycerine generally varying between 15 and 25% by weight of the monomeric acid. Any such types of fusible rosin maleic glycerine esters as thus described may be employed in connection with rosin modified phenol formaldehyde type condensation products in the production of the rosin modified phenolic resins of the present invention.

Various types of phenol formaldehyde resins may be utilized in the present invention. Such phenol formaldehyde resins are generally made by alkaline condensation of a phenol with formaldehyde in the ratio generally of 1 mol of phenol with at least 2 mols of formaldehyde although the latter may vary and for example 3-4 mols of formaldehyde may be employed to 1 mol of phenol or the ratios may otherwise vary. The customary conditions of alkaline condensation are employed. The phenols employed may be of various types including phenol per se (carbolic acid), alkyl phenols including the cresols, the xylenols, and other alkyl phenols as for example para-tertiary butyl phenol, para-tertiary amyl phenol, various aryl substituted phenols such as bis phenol, phenyl phenols, and cyclo hexyl phenols. Usually the phenol formaldehyde type condensation product is prepared as stated by customary alkaline condensation and such condensate reacted with rosin as for example gum rosin in the usual way finally neutralizing the free rosin acid present with a polyhydric alcohol again following the customary procedure of the prior art all of which will be exemplified below. Of the polyhydric alcohols any of the usual polyhydric alcohols may be employed including glycerol, the various glycols, the pentaerythritols.

Of particular practical importance in the present invention are the combinations of the rosin maleic glycerine esters as set forth above with rosin modified phenolic resins. The phenolic resins used for this purpose may be of various types as set forth above such as those produced from unsubstituted phenol, alkyl and aryl substituted phenols, which phenols are alkali condensed with 2 to 4 mols preferably, of formaldehyde. The phenol condensates are reacted with rosin and the free rosin acid is usually esterified with a polybasic alcohol as set forth. Inasmuch as it is the object of the invention to produce very hard resins of high melting point, the amount of phenol-formaldehyde compound present in the rosin modified phenol resin used for the combination with the monomeric maleic ester should be as high as practically possible. The amount of condensate introduced into the rosin compound may be varied according to the melting points and viscosities desired in the phenolic resin. The melting points and viscosities of the fusion product increase with the relative amount of monomeric maleic rosin glyceride present. So that the ratio of phenolic resin to monomeric ester depends on the desired hardness of the final resin, the latter increasing with the amount of monomeric ester present.

The following examples illustrate the invention, parts being by weight unless otherwise indicated. The amounts given in the following examples indicate the desirable minimum of such phenolic additions.

*Example 5.*—This example describes the combination of a phenol formaldehyde rosin modified resin. The phenol formaldehyde resin is obtained by combining one mol of U. S. P. phenol with 2 mols of formaldehyde in the customary alkaline condensation, then reacting 35 parts of this condensate with 100 parts of gum rosin and finally neutralizing the free rosin acid with glycerine in the usual way. The resin obtained has a melting point of 150° and a viscosity of Y. 100 parts of it are now heated to 250° C. and melted together with 75 parts of a monomeric ester resin of a melting point of 200° and a viscosity of $Z_5$–$Z_6$ produced by either of the methods described above in examples 3 or 4. The product resulting from the fusion process is an improved resin with a melting point of 172° and a viscosity of $Z_2$.

In the above example, as generally specified above, cresols and xylenols may replace the U. S. P. phenol and esterification may be carried out with other polyhydric alcohols such as the glycols and pentaerythritols. Furthermore the amount of condensate introduced into the rosin compound may be varied according to the melting point and viscosity desired in the phenolic resin. The melting point and viscosity of the fusion product increases as noted above with the relative amount of monomeric rosin maleic glyceride present.

*Example 6.*—50 parts of the monomeric ester resin obtained by the procedure described in example 3 above, are heated at 250° C. together with 100 parts of a rosin modified bis phenol resin with a melting point of 155° and a viscosity of Z, until complete combination is obtained. The resulting fusion product is an improved resin with a melting point of 170° and a viscosity of $Z_3$. The rosin modified bis phenol resin used for this purpose is produced in the following manner: 20 parts of an alkali catalyzed condensate of 1 mol bis phenol with 3 mols formaldehyde are reacted with 100 parts of gum rosin in the usual way, and the rosin-phenolic body, thus obtained is esterified with 10 parts of pentaerythritol. The addition of bis phenol condensate may be increased by several percent as for example 1 or 2%, if a high viscosity of the phenolic resin is desired, or the amount of formaldehyde combined with the phenol may for example be increased from 3 to 4 mols. As indicated above other phenols may be used in place of the bis phenol for example other aryl substituted phenols such as phenyl phenols and cyclo hexyl phenols may be substituted for the bis phenol and in the esterification other polybasic alcohol such as glycerine or the glycols may be employed.

The percentage of the monomeric rosin maleic glyceride chosen in this example, is comparatively low but may however be increased to any amount according to the final melting point and viscosity desired.

*Example 7.*—100 parts of the rosin modified alkyl-phenol resin with a melting point of 145° and a viscosity of S are heat combined at 250° C. with 100 parts of the monomeric ester resin, obtained by the procedure described in example 4. The phenolic resin is produced by reacting 100 parts of wood rosin with 30 parts of an alkali catalyzed condensate of 1 mol para tertiary butyl phenol with 2 mols formaldehyde in the usual manner. The free rosin acid of the phenolic resin is esterified with 10 parts of glycerine. The product resulting from the fusion of the phenolic resin with the monomeric rosin maleic glyceride is an improved resin with a melting point of 170° and a viscosity of Z.

In the preparaton of the rosin modified phenolic resins, gum rosins or polymerized rosins may be employed and the amount of added condensate may be increased for example to 40 parts in Example 7 above. Further para tertiary amyl phenol for example may replace the butyl compound and for esterification alcohols other than glycerine such as the glycerols and pentaerythritols may be employed.

Having thus set forth my invention, I claim:

1. A rosin phenol formaldehyde resin fused with a fusible rosin maleic glyceride ester having a melting point higher than 180° C. and a viscosity higher than $Z_3$ soluble in coal tar solvents, the rosin maleic acid contained in the ester being monomolecular and the content of glycerine varying between 15 and 25% by weight of the monomeric acid.

2. A rosin phenol formaldehyde resin fused with a fusible rosin maleic glycerine ester having a melting point of 195° C. and a viscosity of $Z_5$ in 60% xylol solution on the Gardner scale, the ester being soluble in coal tar solvents, the rosin maleic acid contained in the ester being monomolecular and the content of glycerine varying between 15 and 25% by weight of the monomeric acid.

3. A rosin phenol formaldehyde resin fused with a fusible rosin maleic glycerine ester having a melting point of 205° C. and a viscosity of $Z_6$ in 60% xylol solution on the Gardner scale, the ester being soluble in coal tar solvents, the rosin maleic acid contained in the ester being monomolecular and the content of glycerine varying between 15 and 25% by weight of the monomeric acid.

4. The resin as set forth in claim 1 in which the phenol is phenol per se.

5. The resin as set forth in claim 1 in which the phenol is an alkyl substituted phenol.

6. The resin as set forth in claim 1 in which the phenol is an aryl substituted phenol.

7. The resin as set forth in claim 1 in which the phenol is tertiary butyl phenol.

8. The resin as set forth in claim 1 in which the phenol is bis phenol.

9. The resin as set forth in claim 1 in which the rosin phenol formaldehyde condensate is neutralized with a polyhydric alcohol.

10. The resin as set forth in claim 1 in which the phenol is an alkyl substituted phenol and the rosin phenol formaldehyde condensate is neutralized with a polyhydric alcohol.

11. The resin as set forth in claim 1 in which the phenol is an aryl substituted phenol and the rosin phenol formaldehyde condensate is neutralized with a polyhydric alcohol.

12. The method of producing a rosin modified phenol resin which comprises heating at temperatures between 225° C. and 280° C. a rosin modified phenol formaldehyde resin and a fusible rosin maleic glycerine ester with a melting point higher than 180° C. and a viscosity higher than $Z_3$, soluble in coal tar solvents, the rosin maleic acid contained in the ester being monomolecular and the content of glycerine varying between 15 and 25% by weight of the monomeric acid.

13. The method of claim 12 in which the fusible rosin maleic glycerine ester has a melting point of approximately 195° C. and a viscosity of $Z_5$ in 60% xylol solution on the Gardner scale.

14. The method as set forth in claim 12 in which the rosin maleic glycerine ester has a melting point of approximately 205° C. and a viscosity of $Z_6$.

15. The method as set forth in claim 12 in which the phenol is phenol per se.

16. The method as set forth in claim 12 in which the phenol is an alkyl substituted phenol.

17. The method as set forth in claim 12 in which the phenol is an aryl substituted phenol.

18. The method as set forth in claim 12 in which the phenol is a bis phenol.

19. The method as set forth in claim 12 in which the rosin phenol formaldehyde condensate is neutralized with a polyhydric alcohol.

20. The product of claim 1, the ratio of resin to ester being from 2:1 to 1:1 by weight.

WILLIAM KRUMBHAAR.

REFERENCES CITED

The following references are of record in the file of this patent:

UNITED STATES PATENTS

| Number | Name | Date |
|---|---|---|
| 2,256,444 | Rosenblum | Sept. 16, 1941 |
| 2,470,855 | Krumbhaar | May 24, 1949 |